July 5, 1960

J. B. JONES ET AL 2,944,029

AEROSOLIZATION PROCESS

Filed Sept. 16, 1957

INVENTORS
JAMES B. JONES
JOHN L. STRAUGHN
BY Arthur H. Seidel
ATTORNEY

United States Patent Office 2,944,029
Patented July 5, 1960

2,944,029
AEROSOLIZATION PROCESS

James B. Jones and John L. Straughn, West Chester, Pa., assignors to Aeroprojects, Inc., West Chester, Pa., a corporation of Pennsylvania Filed Sept. 16, 1957, Ser. No. 684,827
16 Claims. (Cl. 252—305)

The present invention relates to a method for forming aerosols, and more particularly to a method for forming aerosols from liquids or fluids which are deleteriously affected at elevated temperatures. In particular, the present invention is primarily directed to the formation of aerosols of a relatively narrow particle size range from bulk liquids having a viscosity which renders them unsuitable for aerosolization at low temperatures.

True aerosols have a particle size range of the order of 60 microns in diameter, or smaller; preferably below 10 microns, and represent an intermediate stage between the coarsely dispersed state and the atomic or molecular particle size incident to complete vaporization. Additional working features are provided by this subdivision of materials in the finest possible form without complete vaporization, since the aerosol has attributes of both non-vapor and vapor states. Decreased particle size prolongs the life, and therefore, effectiveness, of those colloidal systems, their persistence being less endangered by the settling and agglomeration-settling tendencies of larger, heavier particles. In addition, other characteristics of aerosols, particularly liquid aerosols, are appropriate and useful for specific purposes; their tendency to move even in still air (Brownian movement), their possible ionization, their possession of distinct properties not readily apparent in the original state of the dispersed material.

This selective atomization is useful to science and industry for applications requiring increased surface area. It has been determined that the increased surface area created when dealing with liquids, for example, is inversely proportional to the diameter of the atomized drop; an increase of such magnitude that it is difficult to appreciate readily, but one which has great significance in the hastening of physical or chemical processes involving heat or mass transfer between liquid and gas phases, since these transfer coefficients also increase as drop size decreases.

The aerosolization of many liquids has not proved satisfactory. Thus, for example, the aerosolization of relatively viscous nonionic liquid surface active agents like the fatty acid esters of sorbitol, and the polyoxyethylene fatty acid derivatives thereof, is difficult; as these agents are adversely affected at those elevated temperatures sufficient to reduce their viscosity to a level at which facile aerosolization is feasible. Many other liquids and emulsions comprising an organic compound and other substances are subject to char or deleterious chemical changes due to heat, even at temperatures below the boiling point of the organic compound, or other substance.

In particular, particle size regulation within narrow limits has been found to furnish more even distribution of liquid upon materials to which the aerosolized liquid particles are applied. For example, in the treatment of fabrics by the exposure of such fabrics to a stream of aerosolized particles, the efficacy of the treatment is frequently dependent upon the uniformity of the particle sizes in the stream of aerosolized particles to which the fabric is exposed.

The number of uses to which aerosolized particles may be put is substantially infinite. Examples of uses to which aerosolized particles of controlled size may be put, in which the regulation of the size of the particles is reflected in the efficacy of the process include the following: the coating of farm products with liquids, the coating of solders and tinning agents upon metals, the coating of metals with anticorrosive agents, the application of water-resistant coatings, the coating of a wide variety of materials with insecticides and/or fungicides, the finishing of a wide variety of fabrics with a wide variety of treating agents, the deposition of polishes and/or pigments upon a wide variety of materials, etc. In each instance the control of particle size uniformity and fineness will permit more uniform coatings, and therefore a more satisfactory product.

An object of the present invention is to provide a high-efficiency method by which aerosols may be produced, which aerosols are particularly characterized by the fineness of droplets, with especial reference to the formation of aerosols of liquids in a wide range of surface tensions and viscosities.

It is another object of the present invention to provide a high efficiency method for producing aerosol particles within narrow particle size ranges.

It is a further object of the present invention to provide a method by which production of aerosols of stated characteristics may be carried on economically and by which droplets of desired particle sizes may be produced in large quantities and at high rates.

It is another object of the present invention to provide a method for aerosolizing liquids, which have relatively high viscosity, surface tension or other properties, whose change with increased temperature makes aerosolization more facile.

It is a still further object of the present invention to provide a method for aerosolizing a liquid at an elevated temperature, which liquid is, or may be, deleteriously affected at such elevated temperature.

These and other objects are accomplished by the process of our invention in which a liquid that is adversely affected at elevated temperatures is heated just prior to aerosolization to a temperature below the temperature at which it is adversely affected by heat, which temperature is hereinafter referred to as the liquid's "decomposition temperature." By "adversely affected" is meant charring or other chemical decomposition of the liquid, or deleterious effect on the liquid. The rise in temperature of the liquid favors its aerosolization as it reduces both the viscosity and the surface tension of the liquid. Reduction of either viscosity or surface tension favors aerosolization. At the instant of aerosolization the liquid is contacted with a heated gas and raised to a temperature above its decomposition temperature for a time period of insufficient duration to adversely affect its properties, but to permit its facile aerosolization, followed by cooling of the aerosolized droplets.

For the purpose of illustrating the invention there is shown in the drawings a form which is presently preferred; it being understood, however, that this invention is not limited to the precise arrangements and instrumentalities shown.

Referring to the figures wherein like reference characters refer to like parts:

Figure 1 is a schematic embodiment of apparatus suitable for practicing the method of the present invention.

Figure 2 is a longitudinal section through a nozzle useful for the practice of the present invention.

Referring to the drawings, and initially to Figure 1 wherein a schematic embodiment of apparatus suitable for the practice of the present invention is shown, 10 designates the container or tank for the liquid to be aerosolized. In the specific embodiment of the present invention here-illustrated for the description of the function of the apparatus, such liquid comprises a surface active agent, in particular "Tween 20." Tween 20 is a polyoxyethylene sorbitan monolaurate having a molecular weight of about 1200 and is an oily liquid having a viscosity of between about 250 and 400 centipoises at 25° C., a specific gravity of between about 1.08 to 1.13, a flash point of 610° F., and a fire point of 655° F. A solution of 5.0 to 0.001 weight percent of this material in distilled water has a surface tension of 35 to 50 dynes per centimeter.

While the process of the present invention is illustrated for "Tween 20"; it is, of course, to be understood that the process of the present invention is applicable to other normally viscous liquid surface active agents, organic compounds, inorganic compounds as for example ammonium nitrate, or solutions and emulsions containing a substance that chars, or decomposes, or is otherwise adversely affected on heating, as will be more fully made apparent by reference to the numerous and varied examples of liquids set forth below. Thus, the process of the present invention may be utilized for the normally liquid members of the class of non-ionic surface active agents sold under the trademark "Span," such as sorbitan monolaurate, sorbitan monooleate, and sorbitan trioleate. Other liquid surface-active materials such as "Tweens," namely polyoxyethylene sorbitan monopalmitate, polyoxyethylene sorbitan monostearate, polyoxyethylene sorbitan monooleate, polyoxyethylene sorbitan trioleate, may likewise be utilized.

These aforesaid surface-active materials may be categorized as consisting of the fatty acid esters of hexahydric alcohols, and the fatty acid ester-ethers of hexahydric alcohols.

We have found that "Tween 20" chars when heated in air, for an appreciable period of time to a temperature above 210° F. This temperature is well below the boiling point of "Tween 20"; in fact, "Tween 20" does not have an appreciable vapor pressure at this temperature. "Tween 20" may be safely heated, however, to a temperature within 2 to 5° F. of its decomposition temperature, namely to a temperature of 205° F. without affecting its chemical properties and without charring, although at this temperature it does not possess a viscosity low enough to permit its facile aerosolization.

In tank 10 "Tween 20" is heated to an elevated temperature below 205° F. by means of a heating coil, such as heating coil 12. The heated "Tween 20" is conveyed from tank 10 through line 14 to metering pump 16. In metering pump 16 the heated "Tween 20" is raised to the pressure necessitated by the nozzle or aerosol generator that is utilized.

From pump 16 the "pressurized" surface active agent is conveyed through line 18 to booster heater 20, wherein it is heated to a temperature of 205° F., which as heretofore noted is below its decomposition temperature.

The heated and "pressurized" "Tween 20" is conveyed from booster heater 20, through line 22, temperature indicator 24, line 26 and thence to generator 28. Temperature indicator 24 may be interconnected, by means well known to the art, to booster heater 20 to achieve closely regulated temperature control. Alternatively, booster heater 20 may be provided with a conventional thermostatic control for regulating the temperature of the liquid passing therethrough.

The operation of aerosol generator 28 and the aerosolization of the surface active agent passed thereto will be discussed below.

The gas propellant for the aerosol generator is also passed to aerosol generator 28.

The propellant gas should be an inert gas, where aerosolization without chemical interreaction between liquid and gas is desired. In many instances, such as with most non-ionic surface active agents of the type referred to previously, air can be utilized as the propellant gas, and where this is feasible, the use of air is preferable due to its cheapness. However, where the organic compound is readily oxidizable, inert gases such as nitrogen, carbon dioxide, helium, and fluorinated and chlorinated methane derivatives, such as dichlorodifluoromethane, dichloromonofluoromethane, methyl chloride, trichloromonofluoromethane, and other inert propellant gases may be used. Examples of the use of gases other than air are set forth in the illustrative examples set forth below.

The propellant gas is passed from line 30 through pressure gauge 32 and line 34 to pressure control valve 36. Pressure control valve 36 comprises means for regulating the pressure of the propellant gas to the aerosol generator 28. From pressure control valve 36 the gas is passed through line 38 to heat-exchanger 40 wherein it is heated to a temperature somewhat above the decomposition temperature of the liquid being passed to aerosol generator 28, namely a temperature sufficiently high to raise such liquid to a temperature level at which its viscosity is reduced to the point where it may be readily aerosolized.

We have discovered that liquids that are deleteriously affected by heat may be raised to temperatures well above their decomposition temperatures, without any deleterious effect, if they are raised to such temperatures for but a very brief period of time, such as a period of time below a minor fraction of a second, like a time period of the order of one-hundredth of a second, and then cooled to a temperature well below their decomposition temperatures, such as ambient temperature. Thus, in the subject process the propellant gas or air temperature may be as high as about 300° F., after the air is passed from heat-exchanger 40 into line 42. Control of the air temperature may be effected through air temperature indicator 44 in line 42. The air is passed from indicator 44 through line 46 to aerosol generator 28.

An example of an excellent generator is that disclosed in the co-pending application for United States Letters Patent Serial No. 441,039, filed July 2, 1954, entitled "Apparatus and Method for Generating Aerosols," in the name of James B. Jones.

The generator 28 shown in Figure 2 is that of the aforesaid Serial No. 441,039. However, in place of such generator 28, the generator shown in copending patent application Serial No. 632,332, filed January 3, 1957, for Process for Generating Aerosols and Apparatus Therefor, in the name of James Byron Jones, which utilizes a gas barrier may be substituted, as may other generators which operate generally like the aforesaid generators and which produce dispersions of the liquid into particles having very small dimensions, such as into particles within the aerosol particle size range and within a narrow range of particle sizes within such aerosol particle size range.

Referring particularly to Figure 2, wherein our presently preferred aerosol generator 28 is shown in detail, this generator comprises a liquid conduit 52 which mates with and is a continuation of conduit 26. The liquid conduit 52 discharges the heated "Tween 20" through outlet 54. Generator 28 also includes a conduit 48 for the gas; conduit 48 mating with and being a continuation of conduit 46. As seen in Figure 2, conduit 52 is coaxial with conduit 48, and its outlet 54 concentrically surrounds that portion of conduit 48 proximate outlet 50.

A barrier designated 56 is retained by means of yoke 58 at a spaced axial distance from outlet 50. The face 60 of barrier 56 is juxtaposed to outlets 50 and 54. The propellent gas, namely the heated air, is pressurized to above about 1.5 atmospheres, preferably above 1.7 atmospheres and issues through outlet 50 at supersonic or nearly supersonic velocity, drawing the liquid from outlet 54 into a sleeve-like envelope around the discharge gas stream. As this compressed gas stream carrying the envelope of liquid approaches barrier 56, it is drastically distorted from a unidirectional or axial stream into a substantially radial or disk-like pattern radiating outwardly of the axial flowing stream. The sleeve-like mass of partially disrupted substance, having higher unit mass than the gas stream, impinges into the gas stream, where maximum distortion thereof is taking place, and is further broken down. We have found that, when such substances are properly fed into the field of a distorted, high-velocity, gas stream with the aerosol generating apparatus according to this invention, exceedingly fine aerosols are generated and produced in substantially large quantities at substantially high rates, at low gas consumption, and at low gas pressures in comparison with aerosol generators now known.

The heated air is thus propelled through conduit 48 and discharged through outlet 50, with the heated "Tween 20" being passed through outlet 54 at a temperature below its decomposition temperature, such as a temperature of about 205° F. There is an intimate degree of contact between the gas discharged from outlet 50 and the liquid discharged from outlet 54 for a short period of time, such contact being sufficient to raise the temperature of the "Tween 20" to a temperature level at which its viscosity is low enough to permit aerosolization into a relatively high percentage of minute droplets. However, this period of contact is not long enough to permit charring or other deleterious changes to occur in the aerosol. The aerosolized droplets diverge radially from the direction of the discharge of the liquid from outlet 54 and are rapidly cooled thereafter by contact with the surrounding atmosphere.

Example I

The effect on the aerosolization of "Tween 20" by the elevation of the air temperature and the liquid temperature was studied with the aerosol generator illustrated in Figure 2 at a liquid feed rate of 50 milliliters per minute, an air pressure of 70 pounds per square inch, and an air consumption rate of 3.4 cubic feet per minute. Under these conditions, at room temperature (75° F.), about 12.5% of the "Tween 20" was broken down into droplets of eight microns or less, about 9.5% was broken down into droplets of five microns or less and about 7.7% into droplets of four microns or less. At 125° F., under the same conditions, about 26% of the "Tween 20" was broken down into droplets of eight microns or less, about 18% was broken down into droplets of five microns or less, and about 14% was broken down into droplets of four microns or less. At 205° F., which as heretofore noted is within 5° F. of the decomposition temperature for "Tween 20," about 36% of the "Tween 20" was broken down into droplets of eight microns or less, about 24% into droplets of five microns or less, and about 19% into droplets of four microns or less.

Under conditions where the "Tween 20" is at a temperature of 205° F. and the air is at a temperature approximating 300° F., it is possible to obtain aerosolization of 50% or more of "Tween 20" in the form of droplets having a size below six microns in diameter, without deleterious effect on the "Tween 20," when proceeding in accordance with the process of the present invention.

As heretofore indicated the present invention is applicable to every liquid (and by liquid is meant to include chemical compounds which are liquids, true solutions, colloidal solutions, emulsions, and liquids comprising slurries or dispersions of finely divided solid particles) which undergo a deleterious chemical change when raised to an elevated decomposition temperature below the liquid's vaporization temperature for an appreciable period of time, such liquid being one whose surface tension and viscosity are such at a temperature above its decomposition temperature and below its vaporization temperature as to permit it to be aerosolized.

Example II

Atlas 70% sorbitol solution in water was aerosolized at a temperature of 210° F. to 220° F. using air which had been heated to a temperature of 410° F. to 420° F. under a pressure of one hundred pounds per square inch gauge.

Example III

Carbowax 300, a polyethylene glycol which is a liquid at room temperature, was aerosolized at a temperature of 175° F. using air which had been heated to a temperature of 300° F. under a pressure of one hundred and twenty-five pounds per square inch gauge.

Example IV

Silicone oil having a viscosity of twenty centipoises was aerosolized at a temperature of 200° F. using air which had been heated to a temperature of 300° F. under a pressure of one hundred and twenty-five pounds per square inch gauge.

Example V

Butyl benzyl phthalate having a viscosity of 45 centipoises at 25° C. was aerosolized at a temperature of 150° F. using air which had been heated to a temperature of 250° F. under a pressure of one hundred and twenty-five pounds per square inch gauge.

Example VI

Atlas Span 80, a sorbitan mono-oleate, is aerosolized while at a temperature of 150° F. using nitrogen which is heated to a temperature of 300° F. under a pressure of one hundred pounds per square inch gauge.

Example VII

Atlas G-1690, a polyoxyethylene alkyl aryl ether, is aerosolized at a temperature of 225° F. using helium which is heated to a temperature of 350° F. under a pressure of one hundred pounds per square inch gauge.

Example VIII

Atlas Tween 85, a polyoxyethylene sorbitan trioleate, is aerosolized at a temperature of 200° F. to 210° F. using air which is heated to a temperature of 340° F. under a pressure of one hundred pounds per square inch gauge.

Example IX

Fuel oil No. 2 is aerosolized for combustion at a temperature of 250° F. using air which is heated to a temperature of 400° F. under a pressure of between 120 to 140 pounds per square inch gauge.

Example X

Fuel oil No. 5 is aerosolized for combustion at a temperature of 75° F. using air which is heated to a temperature of 400° F. under a pressure of between 120 to 140 pounds per square inch gauge.

Example XI

Bunker C fuel oil No. 6 is aerosolized for combustion at a temperature of 120° F. using air which is heated to a temperature of 400° F. under a pressure of between 120 to 140 pounds per square inch gauge.

In Examples IX, X, and XI facile aerosolization in conjunction with combustion is achieved with a minimum of coke formation.

The present invention is broadly applicable to the wide variety of other liquids, as heretofore defined, which may be aerosolized. Examples of such liquids include the aerosolization of food oils, such as cooking oils; liquid pharmaceuticals; oils comprising vitamin extracts; oils derived from the crushing, chemical extraction, or molecular distillation of animal or vegetable products, such as fish oils, avocado oil, rose oils, etc.; a wide variety of liquid mixtures or solutions comprising alcohols, esters, amines, carboxylic acids, hydrocarbons, etc.; liquid perfuming agents; etc.

It is of especial value for the aerosolization of polymerizable substance whose polymerization is accelerated by heating, as for example the aerosolization of phenol-formaldehyde resin water solution and slurry mixtures.

The present application is a continuation in part application of our patent application Serial No. 506,207, filed May 5, 1955, now abandoned.

The present invention may be embodied in other specific forms without departing from the spirit or essential attributes thereof and, accordingly, reference should be made to the appended claims, rather than to the foregoing specification as indicating the scope of the invention.

We claim:

1. A method for aerosolizing a liquid which undergoes a deleterious chemical change when raised to an elevated decomposition temperature below its vaporization temperature for an appreciable period of time, said liquid being one whose surface tension and viscosity are such at a temperature above its decomposition temperature and below its vaporization temperature as to permit it to be aerosolized, which method comprises heating an inert gas to an elevated temperature above the decomposition temperature at which the liquid undergoes such deleterious chemical change, contacting a rapidly moving stream of said heated gas at said elevated temperature with a stream of said liquid, said stream of liquid being below its decomposition temperature, said contact aerosolizing at least an appreciable portion of said liquid, the time duration of such contact between said liquid and said gas being insufficient to effect any deleterious chemical change on said liquid but being sufficient to raise the temperature of said liquid for a short time period above such decomposition temperature at which said liquid undergoes a deleterious chemical change to a temperature below the liquid's vaporization temperature at which temperature the surface tension and viscosity of the liquid are reduced to a level permitting the liquid to be aerosolized, and then cooling the aerosolized liquid droplets by passage through a gas to a temperature appreciably below the decomposition temperature of the liquid.

2. A method in accordance with claim 1 in which the time duration of contact between the heated liquid and the heated gas is less than one-half of one second.

3. A method in accordance with claim 1 in which the liquid stream is heated to a temperature above ambient temperature and below the decomposition temperature of the liquid prior to contact with the gas stream.

4. A method in accordance with claim 1 in which the liquid comprises a substance having a boiling point higher than that of water, and in which such liquid is heated to within 2.0° F. of the decomposition temperature at which it undergoes a deleterious change before said liquid is contacted with said gas.

5. A method in accordance with claim 1 in which the liquid is a surface active agent.

6. A method in accordance with claim 1 in which the liquid comprises a non-ionic surface active agent.

7. A method in accordance with claim 1 in which the liquid is a non-ionic surface active agent selected from the class consisting of the fatty acid esters of hexahydric alcohols, and the fatty acid ester-ethers of hexahydric alcohols.

8. A method in accordance with claim 1 in which the liquid is polyoxyethylene sorbitan monolaurate.

9. A method in accordance with claim 1 in which the liquid is sorbitan monolaurate.

10. A method in accordance with claim 1 in which the liquid is sorbitan monooleate.

11. A method in accordance with claim 1 in which the liquid is corbitan trioleate.

12. A method in accordance with claim 1 in which the rapidly moving heated gas stream is moving at supersonic velocities.

13. A method in accordance with claim 11 in which the liquid is a vegetable oil.

14. In a method for aerosolizing a liquid which undergoes a deleterious chemical change when raised to an elevated decomposition temperature below its vaporization temperature for an appreciable period of time, said liquid being one whose surface tension and viscosity are such at a temperature above its decomposition temperature and below its vaporization temperature as to permit it to be aerosolized, the improvement which comprises contacting for a short time duration a stream of such liquid in which the liquid is initially at a temperature below its decomposition temperature with a rapidly moving stream of an inert gas that has been heated to a temperature appreciably above the decomposition temperature of the liquid and below the vaporization temperature of the liquid, the time duration of contact being sufficient to effect the aerosolization of the liquid without its chemical decomposition.

15. A method for aerosolizing a liquid which undergoes a deleterious chemical change when raised to an elevated decomposition temperature below its vaporization temperature for an appreciable period of time, said liquid being one whose surface tension and viscosity are such at a temperature above its decomposition temperature and below its vaporization temperature as to permit it to be aerosolized, which method comprises heating an inert gas to an elevated temperature above the decomposition temperature at which the liquid undergoes such deleterious chemical change, contacting a rapidly moving stream of said heated gas at said elevated temperature with a coaxially enveloping stream of said liquid, said stream of liquid being below its decomposition temperature, impinging the rapidly moving stream of gas upon a barrier and deflecting it at an angle to its normal direction of movement, said deflection of the gas stream aerosolizing at least an appreciable portion of said liquid, the time duration of such contact between said liquid and said gas being insufficient to effect any deleterious chemical change on said liquid but being sufficient to raise the temperature of said liquid for a short time period above such decomposition temperature at which said liquid undergoes a deleterious chemical change to a temperature below the liquid's vaporization temperature at which temperature the surface tension and viscosity of the liquid are reduced to a level permitting the liquid to be aerosolized, and then cooling the aerosolized liquid droplets by passage through a gas to a temperature appreciably below the decomposition temperature of the liquid.

16. In a method for aerosolizing a liquid which undergoes a deleterious chemical change when raised to an elevated decomposition temperature below its vaporization temperature for an appreciable period of time, said liquid being one whose surface tension and viscosity are such at a temperature above its decomposition temperature and below its vaporization temperature as to permit it to be aerosolized, the improvement which comprises contacting for a short time duration a rapidly moving stream of an inert gas that has been heated to a temperature appreciably above the decomposition temperature of the liquid and below the vaporization temperature of the liquid with a coaxially enveloping stream of the liquid, the temperature of said coaxially enveloping stream of liquid being initially at a temperature below the liquid's decomposition temperature, impinging the rapidly moving stream of gas upon a barrier and deflecting it at an angle to its normal direction of movement, said deflection of the gas stream aerosolizing the enveloping liquid stream, the time duration of contact between the liquid stream and the gas stream being insufficient to effect chemical decomposition of the liquid.

References Cited in the file of this patent

UNITED STATES PATENTS

| | | |
|---|---|---|
| 1,150,238 | Winbray | Aug. 17, 1915 |
| 2,364,145 | Huppke et al. | Dec. 5, 1944 |
| 2,437,963 | Langmuir et al. | Mar. 16, 1948 |
| 2,477,947 | Yadoff | Aug. 2, 1949 |
| 2,909,491 | Harmon | Oct. 20, 1959 |